United States Patent [19]
Ohba

[11] 3,856,104

[45] Dec. 24, 1974

[54] SEQUENTIAL CONTROL CIRCUIT FOR A REMOTE-CONTROLLED VEHICLE

[76] Inventor: Shunjiro Ohba, 5969 N. Elston Ave., Chicago, Ill. 60646

[22] Filed: July 7, 1972

[21] Appl. No.: 269,748

[52] U.S. Cl. ................... 180/98, 180/6.5, 180/79.1, 318/16, 318/587
[51] Int. Cl. ...................... B60k 27/00, B64c 13/18
[58] Field of Search ............ 180/6.64, 77, 98, 79.1, 180/6.5; 318/16, 587; 343/112, 16 M, 7 ED

[56] References Cited
UNITED STATES PATENTS

| | | | |
|---|---|---|---|
| 3,046,549 | 7/1962 | Kalmus | 343/112 D |
| 3,456,753 | 7/1969 | Graves | 180/98 |
| 3,472,333 | 10/1969 | Loewenstern, Jr. | 180/77 R |
| 3,720,281 | 3/1973 | Frownfelter | 180/98 |
| 3,742,507 | 6/1973 | Pirre | 318/587 |

*Primary Examiner*—Allen N. Knowles
*Attorney, Agent, or Firm*—Fitch, Even, Tabin & Luedeka

[57] ABSTRACT

A remote-controlled motor-driven vehicle responsive to a control signal transmitted by a portable transmitter carried by a moving individual for transporting a load at a predetermined distance behind the individual has an improved control system which includes a receiver for detecting the transmitted signal and developing therefrom a range signal representative of the distance between the individual and the vehicle and bearing signal representative of the heading of the vehicle relative to the individual. A motor control circuit is responsive to the application of the range and bearing signals for controlling the speed and direction of said vehicle. A detector is coupled to the receiver and is responsive to the reception of the control signal for developing an actuating signal. A switching circuit is coupled between the receiver and the motor control circuit and is responsive to the actuating signal for causing the motor control circuit to first respond to the bearing signal and then respond to the range signal to thus sequentially steer the vehicle in the proper direction and then move the vehicle to the desired distance behind the individual.

8 Claims, 3 Drawing Figures

PATENTED DEC 24 1974　3,856,104

SEQUENTIAL CONTROL CIRCUIT FOR A REMOTE-CONTROLLED VEHICLE

The present invention relates generally to remote-controlled, motor-driven vehicles and, more particularly, to an electronic control system for such a vehicle.

Motor-driven vehicles suitable for transporting a load of some sort and following a moving individual at a prescribed distance are known. One particular application for such a vehicle is a three-wheeled cart for carrying a golfer's golf bag, clubs, etc. The golfer carries a small transmitter on his belt which transmits a control signal to a receiver in the cart so that, ideally, the cart follows the golfer around the golf course at a distance of approximately seven feet without either overrunning the golfer or falling too far behind him. Such carts are often used in preference to "riding" carts because they enable some golfers to enjoy the benefits of the exercise involved in walking around the golf course without suffering the burden of carrying a heavy bag of golf clugs and other equipment which may tend to tire the golfer and have an adverse affect on his playing ability.

Such carts are commonly driven by one or more DC motors which are powered by rechargeable storage batteries. Typically, a pair of antennas and a control circuit are employed to sense the intensity and relative direction of the transmitted signal and cause the cart to follow the golfer at the desired distance.

Conventional control systems for such vehicles, however, often do not direct the vehicle in the most efficient manner, which is usually the direction of a straight line from the vehicle to the individual the vehicle is following. Such inefficiency wastes time and battery power. Moreover, in some situations the orientation of the cart may be such that the control system "thinks" that the cart is farther from the individual than it actually is so that it causes the cart to overreact by starting off rapidly in the wrong direction. Such overreaction may create problems such as causing the cart to travel beyond the range of the transmitter, or even to run into an object such as a tree or water hazard, before it is turned to the correct heading (i.e., toward the individual carrying the transmitter). On the other hand, in situations where the cart remains within the transmitter range, the speed of the cart may be so great by the time it is correctly aimed toward the individual that it does not stop in time to avoid going past or colliding with the individual.

Accordingly, it is an object of the present invention to provide an improved electronic control system for a remote-controlled, motor-driven vehicle of the type responsive to a control signal transmitted by a portable transmitter carried by a moving individual for transporting a load at a predetermined distance behind the individual.

It is another object of the invention to provide such a control system which increases the efficiency and improves the operating characteristics of the vehicle.

Other objects and advantages of the invention are more particularly set forth in the following detailed description, and in the accompanying drawings of which:

Figure 2:
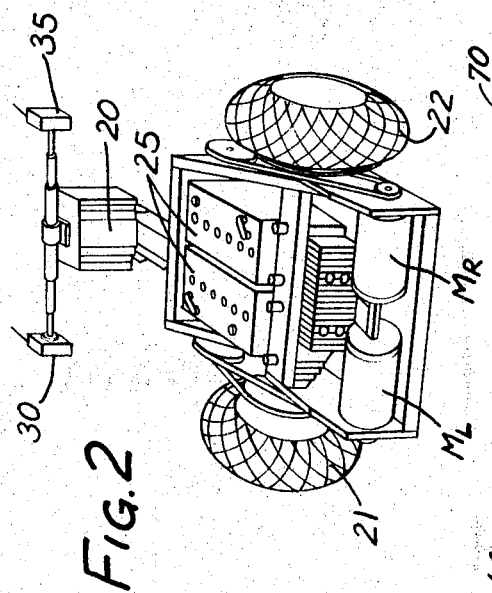
FIG. 2 is a perspective view of the vehicle shown in FIG. 1 but with the outer portion removed to show the general construction of the vehicle.
Figure 1:
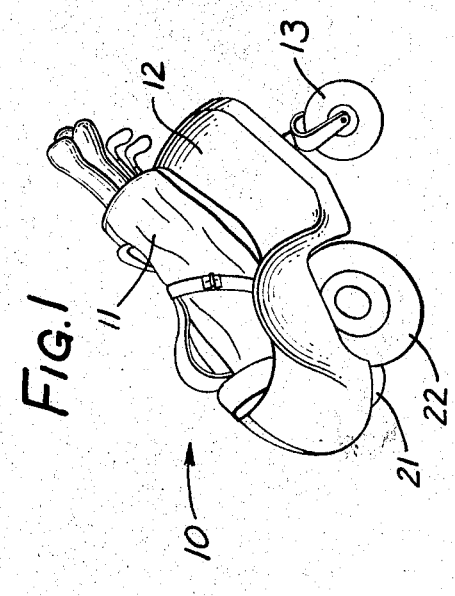
FIG. 1 is a perspective view of a vehicle constructed in accordance with the invention.

With reference to FIGS. 1 and 2, there is generally shown a remote-controlled motor-driven vehicle 10 responsive to a control signal transmitted by a portable transmitter carried by a moving individual (neither is shown), such as a golfer walking around a golf course, for transporting a load such as a bag of gold clubs 11 at a predetermined distance (e.g., about 7 feet) behind the individual. As illustrated, vehicle 10 is a three-wheeled cart with two rear driving wheels 21 and 22 independently propelled by separate DC electric motors $M_L$ and $M_R$, respectively, which are powered by rechargeable storage batteries 25. FIG. 2 is a perspective view of vehicle 10 shown in FIG. 1 but with the outer shell or housing 12 removed. A single front wheel 13 is made freely pivotable about a substantially vertical axis so that the vehicle may be steered by applying greater power to one rear wheel than to the other so as to turn the vehicle in a manner similar to that of a track-type vehicle, such as an armored tank. The particular way in which the motors are coupled to the wheels forms no part of the invention and therefore may be carried out in any suitable manner including the use of a gear train, driving chain, or the like. A pair of antennas 30, 35 are provided for receiving the transmitted control signal and applying a corresponding electrical signal to electronic control circuitry contained in a housing 20 and discussed in greater detail below with reference to FIG. 3.

The transmitter used in conjunction with the system of the invention may be of any conventional type suitable for developing a control signal and propagating it a distance of up to 25 feet or so, depending on the particular circumstances in which the invention is used. The transmitter is preferably a small portable device which may be conveniently carried by the individual in his pocket or on his belt, etc. The transmitter should also have an on/off switch so that the individual may disable the remote-control system when, for example, he wishes to move close enough to the cart (i.e., within the aforementioned 7-foot following distance) to select a club, or while he is off the course such as when he is searching for a lost ball. The signal radiated by the transmitter may preferably be magnetic, rather than electromagnetic, so as to have a limited radiation range, similar to the signals radiated in some garage door opening systems or the like. Moreover, increased immunity of the control system to extraneous signals may be achieved by utilizing an RF carrier wave signal modulated with a predetermined "tone" signal and employing circuitry to detect both the carrier frequency and the modulation frequency. Thus, an extraneous signal having a component at the carrier frequency with an amplitude large enough to be detected by the control system will not actuate it. Carrier wave control signal of different frequencies may be used to enable each member of a group of golfers, for example, to use such a vehicle.

Figure 3:
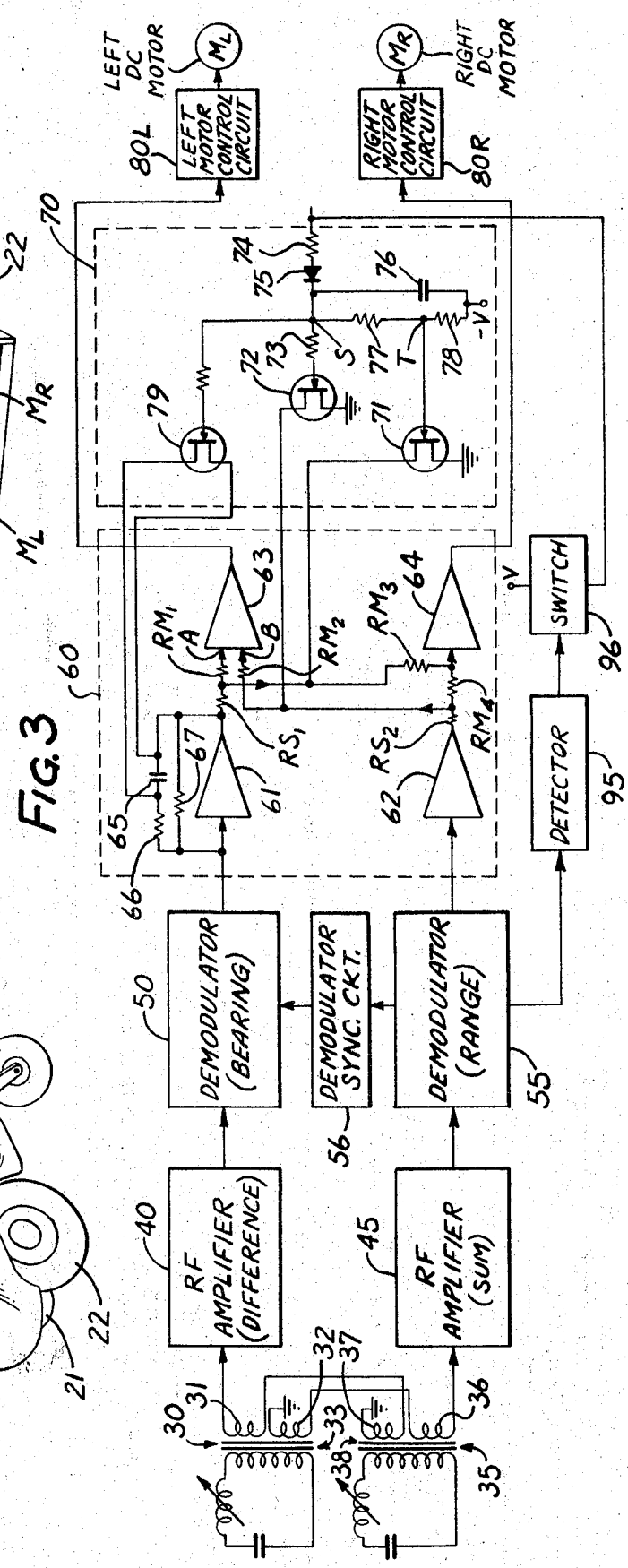
FIG. 3 is an electrical schematic diagram of a control circuit constructed in accordance with the principles of the invention and suitable for use in the vehicle illustrated in FIGS. 1 and 2.

With reference to FIG. 3, there is shown an electrical schematic wiring diagram of a circuit constructed in accordance with the principles of the present invention which may be advantageously employed in the vehicle illustrated in FIGS. 1 and 2. In general, the illustrated embodiment of the invention comprises receiving means including antennas 30 and 35, RF amplifiers 40 and 45, and demodulators 50 and 55, for receiving the transmitted signal and developing therefrom a range signal representative of the distance between the individual and the vehicle and a bearing signal representative of the heading of the vehicle relative to the individual. Vehicle controlling means including a DC amplifying and matrixing circuit 60; left and right motor control circuit 80L and 80R, respectively; and left and right DC electric motors $M_L$ and $M_R$, respectively; are responsive to the application of the range and bearing or steering signals for controlling the speed and direction of the vehicle. Means including a modulation detector 95 and a switch 96 are coupled to demodulator 55 of the receiver means and are responsive to the reception of the transmitted control signal for developing an actuating signal in the form of a voltage V which is applied to motor control circuits 80L and 80R and to a switching means 70. Motor control circuits 80L and 80R form no part of the present invention and may therefore comprise conventional DC amplifiers suitable for applying a DC driving signal to control motors $M_L$ and $M_R$ in accordance with the range and bearings signals. Switching means 70 is coupled between the receiving means and the vehicle controlling means and is responsive to actuating signal V for causing the vehicle controlling means to first respond to the bearing signal and then respond to the range signal to sequentially steer the vehicle in the proper direction and then move the vehicle to the desired distance behind the individual.

More particularly, the embodiment of the invention illustrated in FIG. 3 includes antennas 30 and 35 which may preferably comprise ferrite rods 33 and 38, respectively, having wound thereon primary windings 34 and 39, respectively, which are each tuned to the frequency of the control signal by a suitable capacitor and variable inductor tuning circuit. The range signal is developed by a pair of secondary windings 32, 36 of antennas 30, 35, respectively, which are connected together in phase to produce a signal representative of the sum of the two signals received by antennas 30 and 35. The bearing signal is developed by a pair of secondary windings 31, 37 of antennas 30, 35, respectively, which are connected together in phase opposition to develop a signal representative of the difference between the two signals received by antennas 30 and 35. The thus-developed AC bearing and range signals are applied to conventional RF amplifier circuits 40 and 45, respectively (assuming the transmitted control signal has a frequency in the radio-frequency spectrum). RF amplifier circuits 40 and 45 may be of any conventional design suitable to amplify the AC input signals from each pair of secondary windings 31, 36 and 32, 37, respectively, to a signal level suitable for application to demodulator circuits 50 and 55, respectively. Demodulator circuit 50 converts the AC bearing input signal from RF amplifier circuit 40 to a DC bearing signal having an amplitude representative of the amount or degree of heading error and having a polarity representative of the relative direction, right or left, of the heading error. For example, the signal from left antenna 30 may be used as a reference such that, when the individual with the transmitter associated with vehicle 10 is located to the left of the vehicle, left antenna 30 receives a stronger or more intense signal than does right antenna 35; hence, the difference signal applied to RF amplifier 40 has a phase that may be defined as "positive." When the individual is located to the right of vehicle 10, however, left antenna 30 receives a weaker or less intense signal that does right antenna 35; hence, the difference signal has an opposite phase that is therefore "negative." An AC bearing signal having a positive phase may be converted by demodulator 50 to a DC bearing signal having a positive polarity; negative phase, negative polarity, or vice versa. Consequently, a positive DC output signal from demodulator 50 may be used to indicate a vehicle heading to the right of the individual; a negative DC output signal, to the left. The phase-polarity-direction relationship is arbitrarily chosen and may, of course, be selected in any suitable manner. Similarly, demodulator circuit 55 converts the AC range input signal from RF amplifier circuit 45 to a DC range signal having an amplitude representative of the distance from the vehicle to the individual. The RF amplifiers and demodulators, per se, of the control system form no part of the invention and, if desired, this portion of the system may further include various design features such as automatic gain control (AGC), buffering, or limiting.

Modulation detector 95 responds to the reception of the transmitted control signal to detect a tone signal modulated of the control signal and to thereby cause switch 96 to apply actuating signal V (e.g., +6 volts) to switching circuit 70 and motor control circuits 80L and 80R to energize them only in response to the proper control signal. In embodiments of the invention employing a modulated control signal, detector 95 may be coupled to a portion of the receiver suitable for detecting the modulator signal, such as demodulator 55. In embodiments of the invention not employing a modulated-carrier-wave control signal, however, a detecting means suitable for the particular control signal employed may be substituted for detector 95.

In the specific embodiment of the invention illustrated in FIG. 3, the DC output signals from demodulators 50 and 55 are coupled to a DC amplifier and matrix circuit 60 wherein the range (sum) and bearing (difference) signals are converted into "left" and "right" control signals which are respectively applied to left and right motor control circuit 80L and 80R. A demodulator synchronizing circuit 56 is provided as shown to coordinate the operation of demodulator 50 with that of demodulator 55. Other embodiments of the invention may of course include different arrangements for utilizing the range and bearing signals to control the vehicle. For example, the bearing signal may be used to control the orientation of front wheel 13 of the vehicle 10 to thus direct the vehicle in the desired direction and the range signal used to control both rear wheels 21 and 22 to control the speed of the vehicle to thus maintain the desired distance between the vehicle and the individual it is following. Another example is one in which the front wheel is used for both steering and driving the vehicle, similar to a front-wheel-drive automobile.

DC amplifier and matrix circuit 60 comprises four conventional operational amplifiers 61, 62, 63, and 64 which both amplify the input DC bearing and range signals and matrix or cross-couple them such that the output signals of circuit 60 are in the form of "left" and "right" DC control signals. Operational amplifiers 61 and 62 amplify the DC bearing and range signals, respectively, from demodulators 50 and 55 to produce two corresponding DC output signals that are each applied to the inputs of both operational amplifiers 63 and 64. Operational amplifier 62, however, is operated in a differential mode so that its output signal corresponds to the difference between the signal applied to terminal A (the output signal from operational amplifier 61) and the signal applied to terminal B (the output signal from operational amplifier 62). Thus, the DC bearing and range signals are matrixed or cross-coupled such that the output of operational amplifier 63 represents the difference between the output signals of amplifiers 61 and 62 whereas the output signal of operational amplifier 64 represents the sum of the output signals from operational amplifiers signals 61 and 62. These difference and sum signals respectively represent the aforementioned "left" and "right" control signals.

At this point it is convenient to note that if identical motors and coupling mechanisms are used for left wheel 21 and right wheel 22, then in order to drive the vehicle forward in a straight line it is necessary to apply equal-amplitude but opposite-polarity control signals to motors $M_L$ and $M_R$. This is due to the fact that the motors are generally more conveniently mounted with their output or driving shafts facing in opposite directions, such as shown in FIG. 2. Thus, assuming that the bearing signal is zero, the application of the output signal of operational amplifier 62 (corresponding to the range signal) to both operational amplifiers 63 and 64 results in "left" and "right" DC control signals of equal amplitude but opposite polarity. Consequently, motors $M_L$ and $M_R$ are driven at the same speed but in opposite directions so that the vehicle moves forward in a straight line. On the other hand, assuming that the range signal is zero, the application of the output signal of operational amplifier 61 (corresponding to the bearing signal) to both operational amplifier 63 and 64 results in "left" and "right" DC control signals of equal amplitude and the same polarity. Consequently, motors $M_L$ and $M_R$ are driven at the same speed and in the same direction so that the vehicle turns. When neither the range nor the bearing signal is zero, the "left" and "right" control signals represent the cumulative effect of the two input signals such that the vehicle may be simultaneously turned and moved toward the individual. The vehicle moves forward as long as it is not within a predetermined range (e.g., 10 feet) and turns according to the relative values of the "left" and "right" control signals. For example, the vehicle may be turned to the left when the value of the "left" control voltage is more positive than that of the "right," and to the right when the value of the "left" control voltage is more negative than that of the "right." Thus, if the range signal indicates that the vehicle should move closer to the individual and the bearing signal indicates that the vehicle should turn to the left in order to move in a direction toward the individual, then both motors $M_L$ and $M_R$ would be actuated but right motor $M_R$ would be driven harder than left motor $M_L$ so that the vehicle would both align itself in a direction towards the individual and move in that direction.

In accordance with the illustrated embodiment of the invention, switching circuit 70 is responsive to actuating signal V from switch 96 for causing the vehicle controlling means, including DC amplifying and matrixing circuit 60 and left and right motor control circuit 80L and 80R, to first respond to the bearing signal to control the direction of the vehicle and then respond to he range signal to control the speed of the vehicle. The particular fashion in which this sequential operation is effected depends upon the structure of the vehicle controlling circuitry employed as well as design and manufacturing expedience. For the specific embodiment of the invention illustrated in FIG. 3, the sequential switching is accomplished by using a pair of switching transistors 71 and 72 to initially short circuit to ground both the bearing and range signals and then sequentially remove, first the short circuit of the bearing signal, and then the short circuit of the range signal. Various types of transistors may be used for this purpose. In some instances, however, it is desirable to not only have the vehicle controlling circuitry respond sequentially to the bearing and range signals but also respond gradually to avoid abrupt turns and starts which may cause the vehicle to lose its cargo or even overturn. Thus, in the embodiment of FIG. 3, switching transistors 71 and 72 comprise FET transistors having their source and drain electrodes respectively coupled to the output of operational amplifier 61 and ground and the output of operational amplifier 62 and ground. An FET transistor may be gradually changed from a conductive or "on" state to a non-conductive or "off" state by applying a gradually changing control voltage to the gate or control electrode which because of its relatively high input impedance, has very little effect on the control voltage. The gate or control electrode of transistor 71 is connected to a terminal S by a series resistor 73. Terminal S is coupled to the output of switch 96 by means of a series resistor 74 and a diode 75. Terminal S is further coupled to a suitable negative voltage supply $-V$ (e.g., $-6$ volts) by means of the parallel combination of a timing capacitor 76 and a pair of series-connected timing resistors 77 and 78. The junction of timing resistors 77 and 78 (terminal T) is directly connected to the gate or control electrode of transistor 72.

In operation, the voltage at terminal S is $-V$ when no control signal is received by antennas 30 and 35 because voltage V is therefore not applied to terminal S by switch 66. Consequently, voltage $-V$ is applied to the gates of transistors 71 and 72 to thus turn them on and thereby short circuit the outputs of operational amplifier 61 and 62 to ground. When The transmitted control signal is received by antennas 30 and 35, however, switch 96 is actuated by detector 95 to apply voltage V to terminal S to begin charging timing capacitor 76. The voltage at terminal S thus gradually increases from $-V$ to V. The voltage at terminal T correspondingly increases but, by employing a voltage divider network consisting of a pair of timing resistors 77, 78, the voltage at terminal T is more negative than that at terminal S at any given time during the charging of timing capacitor 76. Transistor 71 and 72 are selected to have similar operating characteristics so that transistor 71 is gradually turned off ahead (e.g., ½ second) of transistor 72 to thereby gradually remove the short circuit from the output of operational amplifier 61 to ground and then gradually remove the short circuit from the output of operational amplifier 62 to ground. Matrix resistors $RM_1$, $RM_2$, $RM_3$, and $RM_4$ and series resistors $RS_1$ and $RS_2$ are provided as shown to form a suitable alternator circuit with the resistances of switching transistors 71 and 72. The exact timing of switching transistors 71 and 72 may be varied somewhat where desired to suit a particular application of the principles of the invention. For example, the turning off of transistor 72 may overlap the turning off of transistor 71; that is, the gradual turning off of transistor 72 may begin before transistor 71 is completely turned off. By applying the control signals to the motor-control circuits in the above-described non-overlapped fashion, the wheels of vehicle 10 are moved to first cause the vehicle to align itself in the direction of the individual and then move towards that individual. Providing a small amount of overlap, however, sometimes increases the smoothness and speed of operation of the vehicle.

By thus having the control system respond sequentially to the bearing and range signals, in accordance with the invention, certain undesirable characteristics of prior art remote control vehicles of this type are eliminated. Immediately prior to actuation, for example, vehicle 10 may not be facing the individual it is intended to follow. Instead, it may be facing in an unfortunate direction (e.g., towards a water hazard, sand trap, tree, or even another player) such that upon actuation, without the system of the invention, the range signal may indicate that the transmitter is some distance away and therefore may cause motors $M_L$ and $M_R$ to move the vehicle forward in a relatively rapid manner before the bearing signal has had time to cause the motors to accurately aim the vehicle. Quite obviously, a vehicle with a conventional control system in this situation could run into the water hazard, sand trap, tree, or other player before it is directed toward the individual.

In accordance with another aspect of the illustrated embodiment of the invention, an optional switching means is provided to gradually increase the sensitivity of the bearing signal portion of the circuit to further improve the operating characteristics of vehicle 10. In some situations, the desired amount of signal gain or sensitivity of the bearing control portion of the system may not be very well suited for other situations. For example, when following an individual laterally around the side of a slope or hill, the vehicle has a natural tendency to head down the hill. The amount of bearing signal gain required in such a situation to align the cart properly is relatively large compared to that required on a level area, for example. Similarly, a relatively large amount of bearing control signal gain may be required when a strong wind blows transversely to the direction of vehicle travel. Thus, providing sufficient bearing control signal gain to adequately direct the vehicle in these situations often results in too much gain in situations where wind and slopes are not a significant factor, sometimes causing the vehicle to "overshoot" its desired alignment or even go into an oscillatory condition.

Accordingly, this optional aspect of the invention comprises a switching transistor 79, which may be an FET transistor similar to switching transistor 71 and 72, responsive to actuating signal V for gradually increasing the sensitivity of the system to the bearing signal. The drain and source electrodes of switching transistor 79 are connected across an integrating capacitor 65 which is connected in series with a feedback resistor 66 in the feedback path of operational amplifier 61. A feedback resistor 67 is coupled in parallel with the series combination of integrating capacitor 65 and feedback resistor 66 which determines the gain of operational amplifier 61 under dynamic conditions; that is, feedback resistor 67 limits the gain of operational amplifier 61 under sustained offset conditions (and thus the sensitivity of the system to the bearing signal) as long as capacitor 65 is not shorted by switching transistors 79. Turning on switching transistor 79, however, shorts capacitor 65 to thus permit the parallel combination of feedback resistors 66 and 67 to determine the gain of operational amplifier 61. Turning off switching transistor 79 allows integrating capacitor 65 to gradually accumulate a charge equivalent to an amount of offset as a function of time which gradually eliminates effect of feedback resistor 66 from the feedback path of operational amplifier 61 and thus restores feedback resistor 67 as the sole gain-controlling element for persisting offset signal. Thus, in accordance with this aspect of the invention, a relatively large value (e.g., 2.2 M ohms) is selected for feedback resistor 67 and a relatively small value (e.g., 330 K ohms) is selected for feedback resistor 66. The gate of switching transistor 79 is coupled to terminal S so that, when switching circuit 70 is first actuated by actuating signal V, the gain of operational amplifier 61 is relatively low (e.g., 2) and to thus prevent capacitor 65 from charging up with the integrated offset signal prior to activation of the steering function.

Thus the invention provides an improved electronic control system for a remote-controlled, motor-driven vehicle of the type responsive to a control signal transmitted by a portable transmitter carried by a moving individual for transporting a load at a predetermined distance behind the individual. By constructing the control system such that it responds to the bearing signal first and then responds to the range signal to thus sequentially steer the vehicle in the proper direction and then move the vehicle to the desired distance behind the individual, the vehicle moves more efficiently and accurately so as to conserve time and battery power as well as to avoid colliding with objects, including the followed individual. Only a single system is required to control both the initial start-up of the vehicle and the subsequent continuous operation thereof until the vehicle is at the proper distance behind the followed individual. Moreover, by utilizing the optional variable-sensitivity feature of the invention, enough bearing control sensitivity is provided for most situations and without undesirable overshoot and oscillating conditions.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. In a remote-controlled motor-driven vehicle responsive to a control signal transmitted by a portable transmitter carried by a moving individual for transporting a load at a predetermined distance behind said individual, an improved system for controlling said vehicle comprising:

means for receiving said transmitted signal and developing therefrom a range signal representative of the distance between said transmitter and said vehicle and a bearing signal representative of the heading of said vehicle relative to said transmitter;

controlling means responsive to said range and bearing signals for first steering the vehicle in the direction toward said transmitter and then moving the vehicle to said predetermined distance behind the transmitter.

2. A system according to claim 1, which further includes means for gradually increasing the sensitivity of said controlling means to said bearing signal.

3. In a remote-controlled motor-driven vehicle responsive to a control signal transmitted by a portable transmitter carried by a moving individual for transporting a load at a predetermined distance behind said individual, an improved system for controlling said vehicle comprising:

means for receiving said transmitted signal and developing therefrom a range signal representative of the distance between said transmitter and said vehicle and a bearing signal representative of the heading of said vehicle relative to said transmitter;

means responsive to said range and bearing signals for controlling the speed and direction of said vehicle;

means coupled to said receiving means and responsive to the reception of said control signal for developing an actuating signal;

switching means coupled between said receiver means and said controlling means and responsive to said actuating signal for causing said controlling means to first respond to the bearing signal and then respond to the range signal to thus sequentially steer the vehicle in the proper direction and then move the vehicle to said predetermined distance behind the transmitter.

4. A system according to claim 3, in which said transmitted control signal is a modulated carrier wave signal and said means for developing said actuating signal comprises a switch and a modulation detector responsive to the detection of said modulation to actuate said switch.

5. A system according to claim 3, in which said switching means comprises a resistor-capacitor timing circuit and a pair of switching transistors coupled between said timing circuit and said vehicle controlling means, said capacitor timing circuit being responsive to the application of said actuating signal for gradually changing the operating state of said transistors in a sequential manner.

6. A system according to claim 5, in which one of said switching transistors is coupled to said bearing signal and, in the absence of said actuating signal, is operated in the conductive stage to short circuit said bearing signal to ground, and the other of said switching transistors is coupled to said range signal and, in the absence of said actuating signal, is operated in the conductive state to short circuit the range signal to ground.

7. A system according to claim 3, which further includes means responsive to said actuating signal for gradually increasing the sensitivity of said vehicle controlling means to said bearing signal.

8. A system according to claim 7, in which said sensitivity increasing means comprises an operational amplifier having a feedback control circuit, and a switching transistor responsive to said actuating signal for gradually changing the resistance of said feedback circuit.

* * * * *